United States Patent

[11] 3,590,152

[72] Inventors Copthorne McDonald
New York;
C. Robert Fine, Harrison, both of, N.Y.

[21] Appl. No. 775,353
[22] Filed Nov. 13, 1968
[45] Patented June 29, 1971
[73] Assignee Vidcom Electronics, Inc.
New York, N.Y.

[54] NARROW BANDWIDTH PICTURE TRANSMISSION APPARATUS
10 Claims, 6 Drawing Figs.

[52] U.S. Cl. .......... 178/6.8, 178/7.2, 178/7.4, 315/22
[51] Int. Cl. .......... H04n 5/20, H04n 5/36
[50] Field of Search .......... 178/6.8, 7.2E, 7.2, 7.6, 6 BWR; 179/2 TV

[56] References Cited

UNITED STATES PATENTS

| | | | |
|---|---|---|---|
| 2,372,344 | 3/1945 | Sprague | 178/6 GA |
| 2,338,646 | 1/1944 | Kessler | 178/7.2 |
| 2,955,159 | 10/1960 | Jones | 178/6BWR |
| 2,978,537 | 4/1961 | Kruse | 178/7.2 |
| 3,061,670 | 10/1962 | Oster | 178/6.8 |
| 3,328,585 | 6/1967 | Briguglio | 178/7.2 |
| 3,389,221 | 6/1968 | MacDonald | 178/7.2E |
| 3,482,040 | 12/1969 | Brinster | 179/2 TV |

*Primary Examiner*—Robert L. Griffin
*Assistant Examiner*—Joseph A. Orsino, Jr.
*Attorney*—Darby & Darby

ABSTRACT: Slow-scan video apparatus for transmitting video information through a narrow band transmission path such as a telephone line, comprises a transmitter and receiver, the transmitter including a photomultiplier responsive to light from the face of a cathode-ray tube reflected from the image to be transmitted, an audio frequency oscillator the output of which is modulated by the video output from the photomultiplier tube, and means for coupling the modulated audio frequency output to the narrow band transmission line. The receiver includes demodulating means which reconstructs the video information and applies it to the cathode of an electron discharge tube to create the transmitted image on the face of the receiver tube, where it is stored, for example, by photography. The transmitted includes a shading control circuit to assure an optical input to the photomultiplier tube proportional to the reflectance of the picture being transmitted over the entire picture area, a brightness control circuit which senses the whitest portion of the image to be transmitted and correlates the modulator output to this whitest level, and a control mechanism which disables the transmitter apparatus when the receiver is not in condition to receive a transmitted image. In addition, the system includes a gamma correction circuit wherein the image is transmitted through the audio frequency transmission path in such a way that noise introduced into the received picture by the transmission path will be subjectively equal in all grey levels, and to make the grey scale rendition of the received picture subjectively similar to that of the transmitted picture.

INVENTORS
COPTHORNE MACDONALD
C. ROBERT FINE

BY Darby & Darby
ATTORNEYS

INVENTORS
COPTHORNE MACDONALD
C. ROBERT FINE
BY Darby & Darby
ATTORNEYS

INVENTORS
COPTHORNE MACDONALD
C. ROBERT FINE
BY Darby & Darby
ATTORNEYS

NARROW BANDWIDTH PICTURE TRANSMISSION APPARATUS

This invention relates to video transmission systems and, in particular, to a slow-scan video transmission system including a transmitter and receiver wherein video information can be transmitted through conventional narrow band transmission paths such as telephone lines and other voice bandwidth channels.

There is an obvious need to provide a commercially feasible means for conveying visual information through narrow band transmission paths such as telephone lines and the government-allotted voice bandwidth radio frequency bands. The use of conventional television techniques for such purposes is not possible because of bandwidth requirements. Facsimile systems, which accomplish this broad objective, are unsatisfactory from a commercial viewpoint in many situations because of the time required to transmit all of the visual information required to construct the original image. A number of slow-scan video systems have been devised for the purpose of transmitting visual information through standard telephone lines or other narrow band channels, but such prior art systems have lacked commercial feasibility either because of insufficient resolution, improper balancing of bandwidth versus time considerations, cost of the apparatus, or a combination of any of the foregoing.

The present invention seeks to provide a practical means for transmitting video information through standard narrow band transmission paths which, as an optimum compromise of known engineering criteria, is commercially feasible from both the viewpoints of cost and performance. In this respect, it is contemplated that the invention may be used to transmit photographs or other pictures through any portion of the telephone networks covering the United States with a hard copy of the transmitted picture being provided at the receiver station within approximately 1 minute. Obviously, such a system would have utility in the transmission of pictures across all areas of the United States. A second, and perhaps equally important contemplated use of the invention resides in its use to transmit visual information through telephone lines or voice bandwidth radio channels to television broadcasting stations to permit the rapid telecasting of events in situations where it may not be possible or desirable to physically locate the required television transmitting apparatus where the events are occurring.

Briefly, in accordance with the invention, a narrow bandwidth picture transmission system comprises a transmitter including a flying spot scanner and a receiver including a display and storage means such as a cathode-ray tube and photographic camera. The transmitter includes special circuits for optimizing the practical use of the flying spot scanner and storage means as part of the system, such circuits including a shading control circuit, a brightness control circuit, and a gamma control circuit. Additionally, the transmitter and receiver include monitor means to indicate when the apparatus is in proper condition to transmit and receive an image and to enable transmission only when the apparatus is in such condition.

The manner in which the objects of the invention are accomplished is explained in further detail below with reference to the attached drawings, wherein.

Figure 1:
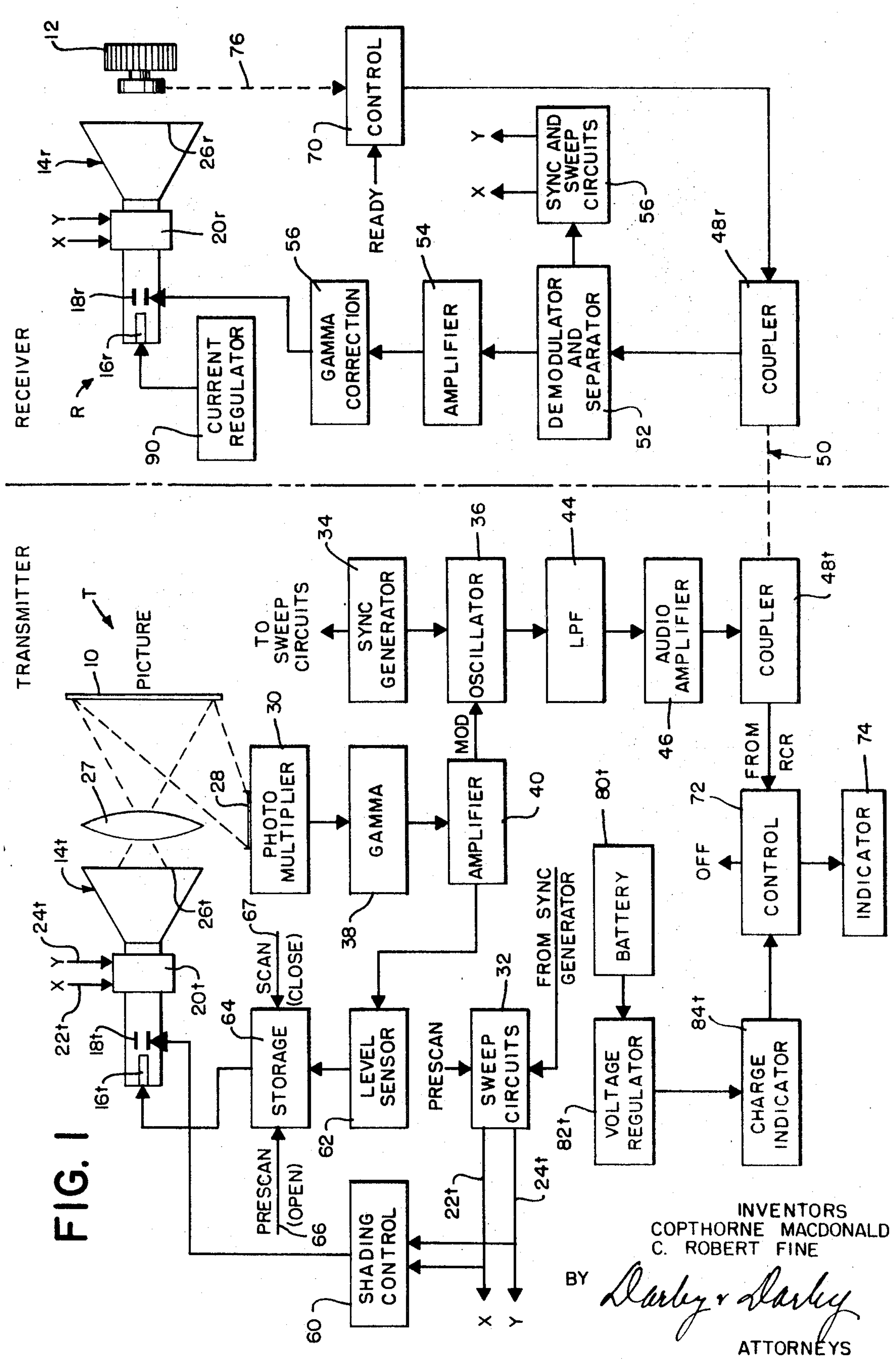
FIG. 1 is a block diagram of a transmitter and receiver according to a preferred embodiment of the invention.

In FIG. 1, the transmitter station is shown at "T" and the receiver station at "R." It is desired to transmit the image on a picture 10, typically a photograph from a Polaroid camera, to receiver station "R" where it can be reproduced and photographed by a Polaroid camera 12, or its equivalent.

The transmitter T includes a cathode-ray tube **14*t* which includes a cathode 16*t*, a cylindrical control grid 18*t*, and X and Y deflection coils 20*t* to which sweep voltages are respectively applied on leads 22*t* and 24*t*. The cathode-ray tube 14*t* includes a phosphorescent tube face 26*t* which emits light when struck by an electron beam from cathode 16*t***. Since the operation of the cathode-ray tube is conventional, a detailed description is not included herein.

An optical lens 27 focuses the light emitted from the cathode-ray tube face **26*t* onto the photograph 10 where it is reflected to the photocathode 28 of a conventional photomultiplier tube 30. The photomultiplier tube 30 produces an electrical output current which varies in amplitude in direct proportion to the intensity of the light impinging upon the photocathode 28**. This arrangement is frequently referred to as a flying spot scanner, and, for the purposes of the present invention, is superior to ordinary video camera tubes from practical view points such as portability and reliability.

In the preferred embodiment, each frame requires 1 minute and there are 400 lines per frame. That is, each photograph 10 is scanned by 400 lines over a period of 1 minute. For this purpose, sawtooth deflection voltages are generated by sweep circuits 32, the outputs of which are coupled directly to the X and Y deflection coils **22*t* and 24*t*. In the usual fashion, this causes the electron beam emitted from cathode 16*t* to scan back and forth, and up and down, over the face 26*t* of the cathode-ray tube, thereby scanning the image of photograph 10 with the variation of the optical intensity of the beam reflected from the photograph being detected by photomultiplier 30**.

A sync generator 34 produces sync signals for synchronizing the operation of sweep circuits 32 with the sweep circuits within receiver R which control the scanning of the receiver display means as described below. In a well-known manner, these sync signals control the timing of the sawtooth waveforms appearing on the X and Y deflection lines **22*t* and 24*t*** respectively.

An audio oscillator 36 generates an audio frequency of, for example, 2300 Hz. The output of the photomultiplier is coupled through a gamma-adjusting circuit 38 (the purpose of which is described below) and an amplifier 40 to modulate the frequency of the output of oscillator 36. The synchronizing signals from sync generator 34 are also used to modulate the audio signal from the oscillator 36. Although any type of modulation is feasible, where the information is to be transmitted over a dial telephone system, frequency modulation is preferred. As a further example, the carrier frequency may be modulated between 2,300 cycles (white) and 1,500 cycles (black), the sync signals being transmitted at 1200 cycles, or blacker than black.

A low-pass filter 44 removes the harmonics from the subcarrier on the modulator output and the subcarrier is then amplified by an audio amplifier 46 and coupled to a coupler **48*t* which applies the modulator signal to the voice band transmission path 50. Where the transmission path 50 comprises a telephone line, coupler 48*t*** may comprise a commercially available electroacoustical coupler such as the coupler sold by the Xerox Corporation under the trademark "Telecoupler," product code X–245A.

The receiver R includes an electron discharge tube **14*r* which may be identical to cathode-ray tube 14*t* and is labeled in a corresponding manner. A coupler 48*r*, identical to coupler 48*t*, couples the audio output from the telephone line 50 (taken from the telephone handset at the receiver station) to a demodulator and separator 52 which couples the video information to an amplifier 54 and the sync pulses to the receiver sweep circuits 56. The output of amplifier 54 is passed through a receiver-gamma-adjustment circuit 56, the purpose of which is explained below, to the CRT control grid 18r, where it is displayed on the receiver tube face 26r under the control of sweep circuits 56** in a conventional fashion.

When a flying spot scanner is packaged in a relatively small enclosure, as envisioned for the present invention, the optical collection efficiency of the photomultiplier generally will not be uniform. In other words, when the light beam from the cathode-ray tube scans a uniform optical field on photograph 10, the output current of the photomultiplier will not remain constant. To some extent this is intuitively obvious inasmuch as the optical path and angle of reflection between the face 26t of the cathode-ray tube and the photocathode material 28 changes substantially as the photograph 10 is scanned from top to bottom (and from side to side), with both changes resulting in a variation of optical collection efficiency.

To overcome this drawback, a shading control circuit 60 within transmitter T, responsive to the X and Y deflection voltages from sweep circuits 32, is coupled to the control grid 18t of cathode ray tube 14t to control the brightness of the scanning optical beam as a function of the position of the beam. The shading control circuit 60 changes the bias on control grid 18t as the photograph 10 is scanned, so that the output of photomultiplier 30 will remain constant when the beam is scanning a uniform light field. The required control voltages, and thus the circuitry of the shading control 60, will vary substantially depending upon the actual physical arrangement of CRT 14t, picture 10 and photomultiplier 30 within a particular enclosure. In one arrangement where the parts were generally arranged as shown in FIG. 1 (with the photomultiplier 30 to the side of the cathode-ray tube 14t), the shading control 60 varied the bias on the CRT control grid 18 by applying two frame rate control voltages and one line rate control voltage as explained below with respect to FIGS. 2A and 2B.

A feature of the invention is a brightness control circuit which compensates for optical variations which may exist from photograph to photograph (to be transmitted) and for any drift which may occur in the electronic components. This control (explained in detail with respect to FIG. 3), includes a level sensor 62 and a storage device 64 connected in a negative feedback loop between the output of amplifier 40 and the cathode 16t of the transmitter cathode-ray tube 14t to control the intensity (i.e., brightness) of the beam emitted from cathode 16t. The level sensor 62 is set to "sense" a preselected amplifier output level which is selected to represent the "white" carrier level. For example, it may be desired that the white video signal (in a frequency modulated system) result in a carrier frequency of 2,300 c.p.s. The negative feedback loop including the level sensor 62 and storage 64, ensures that the brightest spot on the picture to be transmitted is correlated to this white carrier frequency of 2,300 cycles.

Prior to transmitting the picture, a "prescan" signal applied to the sweep circuits 32 applies a coarse raster (for example, fourteen lines) on the face 26t of the cathode-ray tube 14t. During this prescan period, each time a voltage in excess of the preselected "white" level of amplifier 40 is directed by level sensor 62, a voltage is applied to the storage device 64 to reduce the voltage on the cathode 16t and thereby reduce the intensity of the scanning optical beam. In this way, during this coarse prescanning period, the brightest spot detected on photograph 10 is caused to produce the desired output from amplifier 40 which will result in the white frequency of 2,300 cycles.

As shown diagrammatically by the lines 66 and 67, the negative feedback loop to the brightness control of the cathode-ray tube 14t is only open during the prescan period so that during the normal picture transmission mode of operation, the brightness of the picture will not affect the bias on cathode 16t.

The logic required to initiate and terminate the prescan period will be obvious to those skilled in the art and has not been illustrated in the interests of simplicity. In like fashion, the necessary change of the frame rate voltage applied to the Y deflection coil on line 24t can be made by obvious techniques, such as by switching a circuit having a new time constant into the circuit in response to the signals initiating the prescanning period.

As in some video transmission systems, the present invention includes gamma control circuitry which, in its preferred embodiment, differs from the gamma correction generally employed in such systems.

It is well known that the human eye responds logarithmically to optical values, the sensitivity of the eye to changes in the black region of the gray scale being substantially greater than its sensitivity to changes in the white region. It is obviously desirable to transmit the image on picture 10 from the transmitter T to the film of camera 12 at receiver R without affecting the gray scale. The current output of photomultiplier 30 is linearly related to the reflectance of the image on picture 10 being transmitted. That is, for equal increments in change of reflectance from picture 10, there are equal increments in change of current from photomultiplier 30. If this linear relationship were maintained during transmission to the receiver of cathode-ray tube 14r, the effect of ordinary noise during transmission would be to unduly affect the black portions of the received image. According to a further feature of the invention, the linear output of the photomultiplier 30 is converted to a logarithmic signal for transmission to the receiver where it is reconverted to linear brightness changes on the face of the cathode-ray tube 14r.

As used herein, the term "logarithmic" does not require a relationship which is precisely logarithmic, it being sufficient that the steps of a transmitted logarithmic reflectance grey scale chart be transmitted as more nearly equal in amplitude than a linear translation of the original chart would be.

According to this feature of the invention, a gamma-regulating circuit 38 is coupled to the output from the photomultiplier 30 and converts the photomultiplier output current into a logarithmic voltage. The gamma-regulating circuit 38 may comprise a logarithmic amplifier which produces an output voltage directly proportional to the logarithm of the input current thereto. Since it is this logarithmic voltage which is actually transmitted, the effect of noise on the observed image will be the same for the entire gray scale.

Figure 4A:
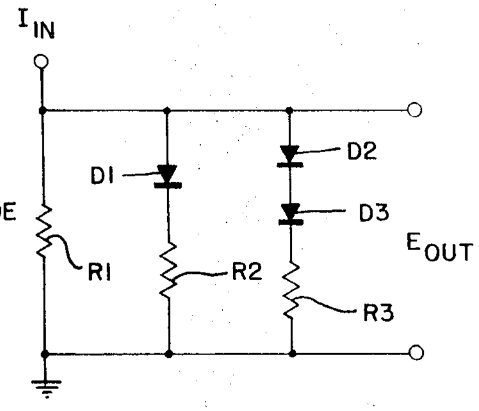
FIG. 4A is a schematic diagram of preferred gamma control circuit used with the system of FIG. 1.
Figure 4B:
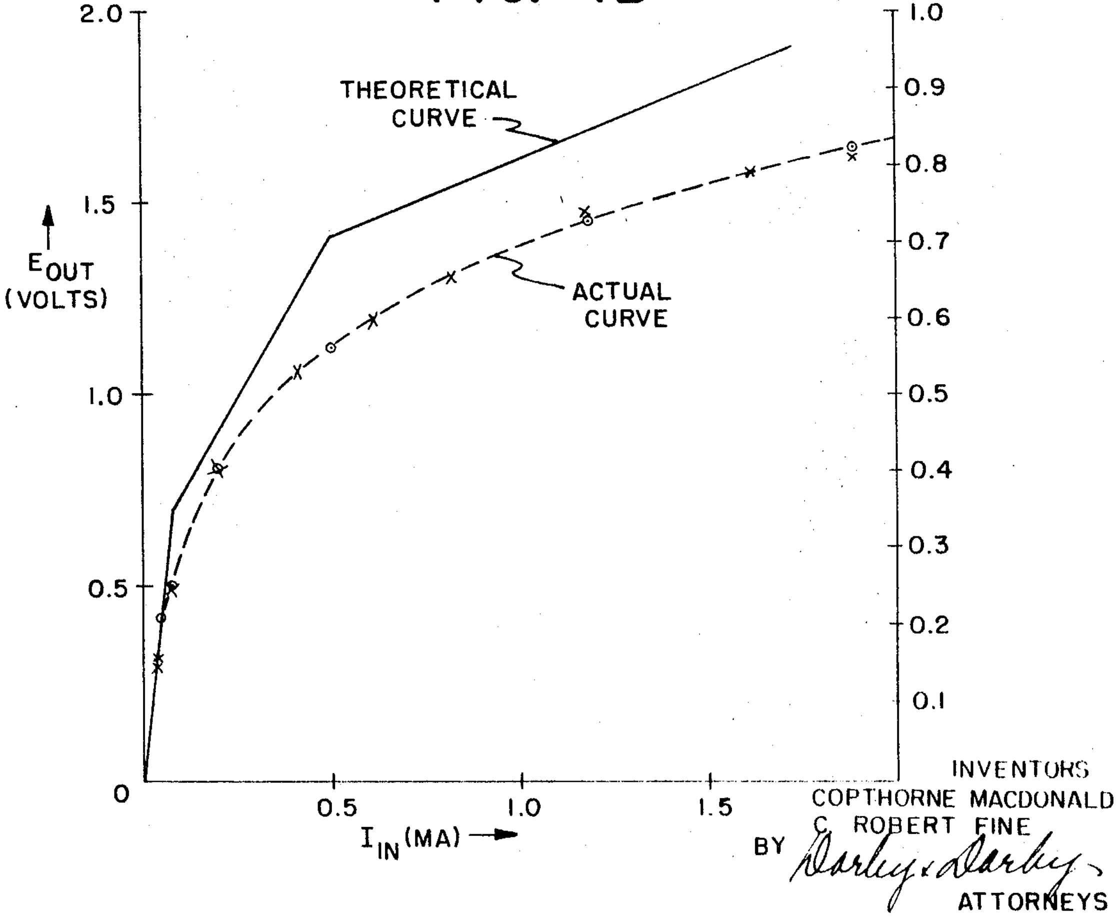
FIG. 4B is a graph used to explain the operation of FIG. 4A.

Prior to displaying the information at the receiver R, it is necessary to reconvert the transmitted logarithmic signal to brightness variations on the tube screen 26r that will give a faithful reproduction on the display means of the reflectance variations of picture 10. This is the function of the gamma-regulating circuit 56 (described in greater detail below with respect to FIGS. 4A and 4B) within the receiver R connected to the output of the amplifier 53. Since the electron discharge tube 14r and the film within the camera 12 both have nonlinear gray scales, it is not sufficient to merely provide the antilog of the video output from the amplifier 54. However, the proper reflectance values can be retrieved by suitably compressing the black region of the gray scale and stretching those signals within the white region. For this purpose, in an operative embodiment of the invention, a diode resistor matrix such as illustrated in FIG. 4 was used. Other gamma regulation circuits may be employed and, in fact, the voltage required to reconstruct the linear gray scale may differ substantially from that shown where the receiver display tube and camera or other storage means employed have different gamma characteristics.

The system according to the preferred embodiment of the invention includes other features of particular value in providing a commercially feasible video system of the type intended. For example, it is contemplated that a control circuit 70 within receiver R be coupled back to transmitter T through the couplers 48r and 48t to a control circuit 72 within the transmitter to enable and disable the transmitter under various conditions. Hence, the receiver control 70 may apply a "ready" signal which is coupled through transmitter control 72 to a visual indicator 74 (e.g., a lamp) to indicate that the receiver is in condition to receive a transmitted image.

Furthermore, the control 70 may be mechanically locked to the camera 12 as indicated diagrammatically by dashed line 76 so that, by suitable logic, it causes the transmitter control 72 to inhibit transmission of a "ready" signal until the exposed film is removed from the camera 12. This "ready" signal may comprise an 800-cycle tone which can easily be coupled through the telephone lines used in the preferred embodiment.

It is contemplated that the transmitter T and receiver R both be operated by battery such as the battery 80*t*. In both cases, a voltage regulator 82*t* would provide a desired voltage output for the battery and its regulated voltage would be coupled to a power supply (not shown). A charge indicator 84*t* may sense the voltage output of regulator 82*t* and provide a signal to the transmitter control 72 which will turn the entire system off in the event the battery voltage falls below a desired level. It is also contemplated that warning signals be provided when the charge indicator 84*t* indicates that the minimum battery level is being approached. The same parts may be included in the receiver R and, in this case also, the battery recharge indication may be returned to the transmitter T as an indication and/or to disable the equipment from operation where the receiver battery has become discharged.

To ensure that the film within camera 12 is properly exposed, the cathode current within the receiver display tube 14*r* may be monitored by a suitable regulating circuit indicated at 90. It is not necessary that the camera include a shutter, since the tube 14*r* is gated electrically, although an electrically operated mechanical shutter can be used where it may not be desired to blank the tube 14*t* outside the period of actual picture reception.

Figure 2A:
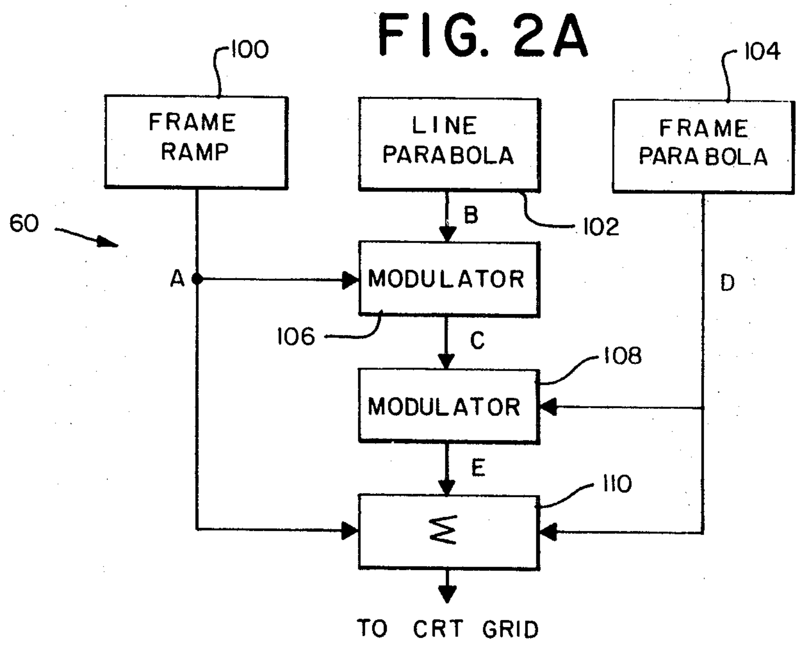
FIG. 2A is a block diagram of a preferred embodiment of a shading control circuit used with the system of FIG. 1.

FIG. 2A is a block diagram showing the shading control circuit 60 used in an operable embodiment of the invention. Three generators 100, 102 and 104 are shown which, respectively generate a frame ramp, line parabola and frame parabola. These terms are standard nomenclature relating to the television arts in general, and these particular voltages actually are produced within the sweep circuits 32, the voltages represented schematically by the blocks 100, 102 and 104 commonly existing in the sweep circuits of a video transmitter. The frame ramp is a cyclical ramp or sawtooth voltage having a period equal to the time required to scan one frame. The line (or frame) parabola is a cyclical voltage which is a parabolic function of time and which has a period equal to the time required to scan one line (or frame).

Figure 2B:
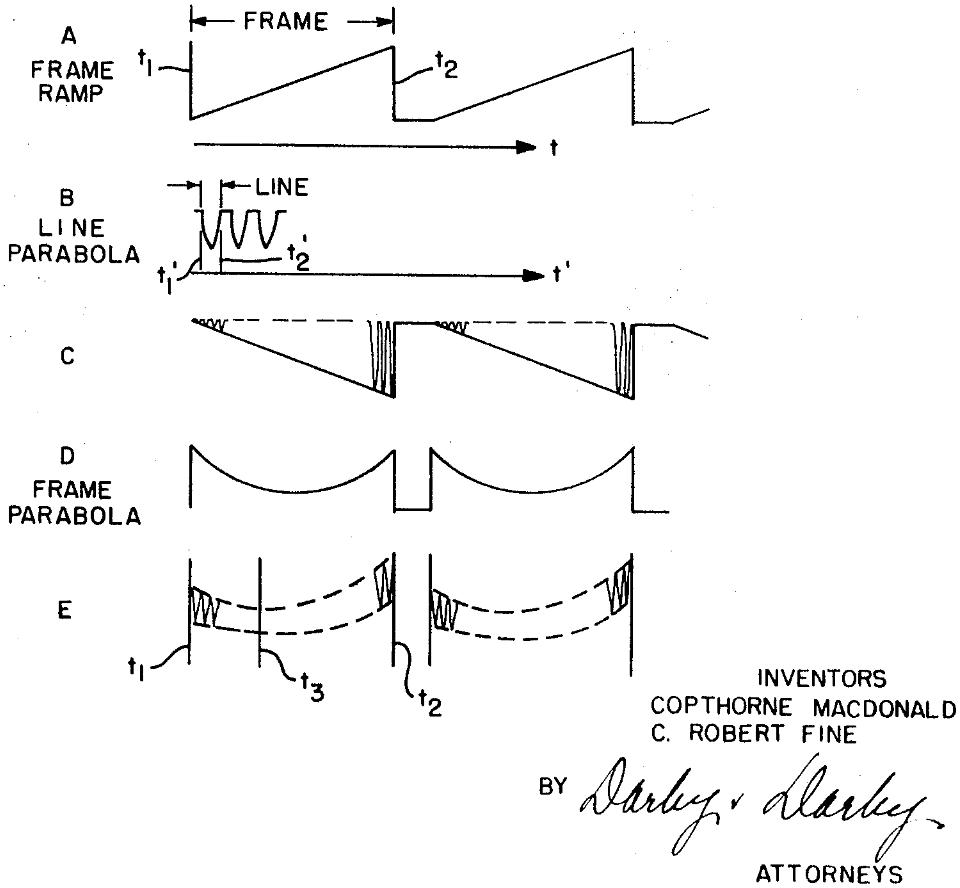
FIG. 2B is a timing chart showing the waveforms generated by the shading control circuit of FIG. 2A.

The waveforms produced by the frame ramp generator 100 and the line parabola generator 102 are shown respectively as waveforms A nd B in FIG. 2B. The frame parabola from generator 104 is shown as waveform D. Waveform B is drawn to a different time scale from that of waveform A as well as the remaining waveforms, there being 400 line parabolas during each of the individual frames.

The frame ramp represented by waveform A is shown increasing from a minimum voltage at time $t_1$ to a maximum voltage at time $t_2$. This interval represents the time required to scan the entire photograph. Assuming that scanning occurs away from the photomultiplier 30, waveform A indicates that the frame ramp voltage from generator 100 is a minimum when the scanning beam is closest to the photomultiplier 30 and a maximum when the beam is furthest therefrom. Likewise, waveform B shows the line parabolas occupying periods from time $t_1'$ to $t_2'$, with a parabolic voltage having a minimum value in the center of this time period. Thus, considering time $t_1'$ to indicate the time at which the scanning beam is at the left of the photograph and time $t_2'$ to indicate the time at which the beam is at the right of the photograph, the line parabola voltage, if applied directly to the control grid of the cathode-ray tube, would cause maximum brightness at the left- and right-hand edges of the photograph during each scanned line. A slight blanking interval is shown between adjacent frames and between adjacent lines in FIG. 2B.

The frame ramp voltage A and parabola D compensate for the redu 'ion in length of the optical path (from face 26*t* of tube 14*t* to photocathode 28) as the scanning optical beam approaches the photocathode 28, and the change of the angle of reflection of the optical beam as it moves away from the photomultiplier 30. (As this angle of reflection changes, the collection efficiency of the photomultiplier 30 also changes.) Minimum correction signal is generally required near the center of the photograph 10. Thus, the frame parabola adjusts the beam brightness to provide maximum brightness when the scanning beam is at the near and far end of the photographs.

The line rate voltage applied by the shading control 60 is a more complicated voltage comprising a line parabola B amplitude-modulated by (1) the frame parabola D and (2) the frame ramp A. The purpose of the line parabola is generally to accommodate for changes in optical collection efficiency and the inverse square law off the picture axis, particularly in the corners. Since the amount of "off axis" compensation required changes as the scanning beam moves toward the photomultiplier 30, it is necessary to alter the amplitude of the line parabola B by modulating it by a frame ramp voltage (A) and a frame parabola voltage (B).

Accordingly, the outputs of frame ramp and frame parabola generators 100 and 102 are coupled to a modulator 106 which modulates the highest frequency line parabola B by the frame ramp D, producing an amplitude-modulated signal having the envelope of waveform C. This signal represented by waveform C is then coupled to a second amplitude modulator 108 and modulated by the frame parabola D. The output of modulator 108 (shown at E) thus comprises a series of successively decreasing line parabolas which reach a minimum value at time $t_3$ (which is slightly before the scanning beam reaches the center of photograph) and then increase progressively to a maximum value at time $t_2$ which is the end of the frame and thus the time at which the scanning beam is furthest from the photomultiplier.

The frame ramp voltage, frame parabola and the output of modulator 108 are then summed in a summing network 110 to provide the brightness control signal which is coupled to the grid of the cathode-ray tube.

Inasmuch as it is expected that different control voltages will be used with different physical configurations and enclosures, the specific shading control circuits have not been illustrated, the design and fabrication of such circuits being well within state-of-the art techniques.

Figure 3:
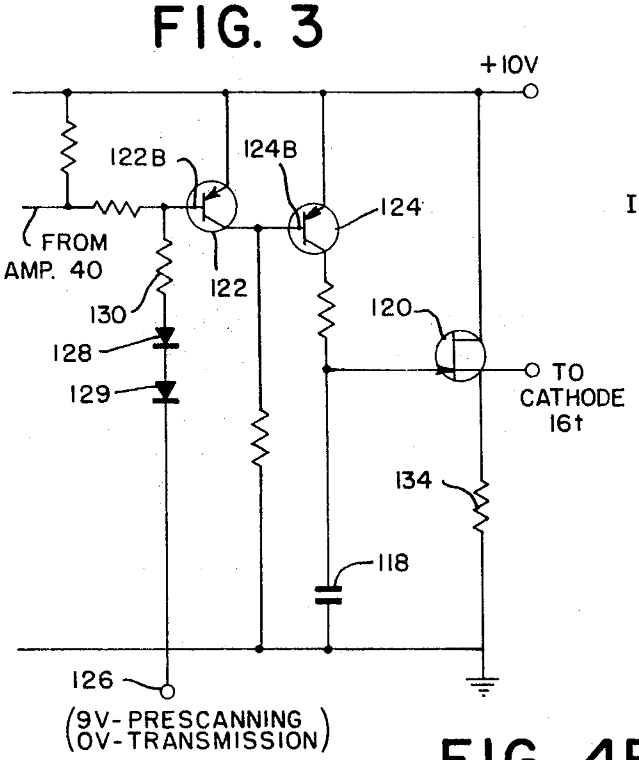
FIG. 3 is a schematic diagram of a preferred brightness control circuit used with the system of FIG. 1.

FIG. 3 is a schematic diagram of the preferred embodiment of the brightness control circuits including the level sensor 62 and storage 64 of FIG. 1. In the description of FIG. 3, representative voltages are given to facilitate an explanation of the circuit.

The storage 64 comprises a capacitor 118 and a field effect transistor 120 connected as a source follower between the capacitor 118 and the cathode 16*t* of cathode-ray tube 14*t*. The level sensor includes two transistors 122 and 124 connected in cascade, with the base 122B of transistor 122 being coupled to the output of the amplifier 40 to receive the video output of the flying spot scanner. The base 122B of transistor 122 is coupled to a control terminal 126 through diodes 128, 129 and series-connected resistor 130.

For purposes of explanation, it is assumed that a 10-volt positive bias is applied to the emitters of transistors 122 and 124 and that the "white" video output of the photograph being scanned desirably corresponds to 9.3 volts. When a positive voltage of 9 volts is applied to terminal 126 during the prescanning period, normally, transistor 122 conducts applying the 10-volt bias to the base 124B of transistor 124 to cut off conduction through transistor 124.

When the scanning beam is reflected from a white area of the photograph such that the output of video amplifier 40 exceeds 9.3 volts, the increased voltage applied to the base 122B causes conduction through transistor 122 to decrease. This lowers the voltage applied to the base 124B of transistor 124, increasing conduction through this transistor. As conduction through transistor 124 increases, the voltage across the capacitor 118 increases, applying a more positive voltage to the cathode 16*t* through source follower 120 to reduce the intensity of the beam.

After the prescanning period is over, a zero or ground voltage is applied to the control terminal 126 during the picture transmission period. With proper selection of resistor 130, this maintains transistor 122 conductive thus blocking conduction through transistor 124 and preventing changes in the scanner output from affecting the voltage across storage capacitor 118. Hence, the prescanning brightness control voltage across capacitor 118 is maintained during the entire picture transmission period. After the picture has been sent, the charge on capacitor 118 is permitted to leak to ground through resistor 134 by removal of the 10-volt bias.

The gamma adjustment circuit 38 of the transmitter T may comprise a standard logarithmic-type amplifier and is not illustrated herein. With respect to the preferred embodiment of the invention, the gamma circuit 56 of receiver R will be more complex because of the need to consider the gamma factor of the receiver display tube 14*r* and the film of camera 12. FIG. 4A illustrates a diode resistor matrix used in an operable embodiment of the invention for maintaining desired gamma factor.

The circuit of FIG. 4A takes advantage of the forward conducting characteristics of a diode. Thus, a diode generally does not commence conduction until the forward voltage across the diode exceeds a predetermined value. When the diode starts to conduct, this voltage remains substantially constant regardless of the forward voltage applied to the diode.

In FIG. 4A, the resistor diode matrix consists of three branches, comprising, respectively, a resistor R1; a diode D1 and resistor R2 in series; diodes D2, D3 and resistor R3 in series. These three branches are connected in parallel and the input current from the amplifier 54 fed to the junction of the three branches as illustrated. The output voltage is taken across the parallel connection.

For low values of input current, the diodes D1, D2 and D3 are not conducting, and current flows only through resistor R1. Thus, the voltage output increases linearly with respect to the input current. When the diode D1 starts to conduct, current will flow also in the second branch including the resistor R2, thus reducing the total impedance in the circuit and similarly reducing the slope of the output voltage as measured against input current. Because of the two series diodes D2 an D3, the third branch still will not conduct. However, this third branch will be conducting when the forward voltage across the series combination is twice the voltage required to cause one of the diodes to conduct. When this voltage is reached, all three branches commence conduction, thereby further reducing the slope of the curve of voltage output versus input current. By suitable selection of the resistors R1, R2 and R3, the voltage output may be made to include the desired gamma correction, depending on the characteristics of the film and cathode-ray tube 14R.

FIG. 4B shows the theoretical and actual curves obtained where R1 equalled 10,000 ohms, R2 equalled 2,000 ohms, R3 equalled 560 ohms, and the diodes D1, D2, and D3 commenced conduction at a forward voltage of about 0.7 volts.

Obviously, there are many possible modifications of the preferred embodiment illustrated and described herein. For example, a direct view storage tube may be used in place of the receiver cathode-ray tube and camera. Along similar lines an "electrical in electrical out" temporary storage tube in conjunction with an ordinary video display tube can be used as the receiver display means. As previously noted, the invention can be used with various transmission paths, the general criterion being that the bandwidth be approximately that required for the transmission of voice signals. Other modifications of the invention will be apparent to those skilled in the art, and the invention therefore should be defined with reference to the attached claims.

We claim:

1. Slow-scan video apparatus comprising a transmitter and receiver connected by a narrow band transmission path, said transmitter comprising a cathode-ray tube, vertical and horizontal sweep means for producing voltages which cause an electron beam to be scanned across the face of said tube, said beam being converted into a light beam on said tube face, said tube including means for varying the intensity of said light beam, means for focusing said light beam on the picture to be transmitted, photosensitive means responsive to the reflection of said light beam from said picture for producing a current which is a function of the light intensity of said reflected beam, an audio frequency oscillator, means responsive to the current from said photosensitive means for modulating the output of said audio frequency oscillator, means responsive to the voltages produced by said sweep means for generating a control voltage having an amplitude related to the position of said optical beam relative to said photosensitive means, said control voltage being coupled to said intensity varying means to provide a substantially uniform light input to said photosensitive means when said optical beam is scanning a uniform optical field, and means coupling the modulated output of said oscillator to said narrow band transmission path, said receiver comprising means for demodulating said modulated output applied to said transmission path, and means for reproducing and storing said image.

2. Slow-scan video apparatus according to claim 1, including means for producing a voltage which is a logarithmic function of the output current of said photomultiplier, and means for adjusting the level of the output of said demodulating means so that the image stored in said reproducing and storing means has essentially the same gray scale as the image to be transmitted.

3. Slow-scan video apparatus according to claim 1, including means for prescanning said image prior to picture transmission, means for sensing when the level of the output of said photosensitive means exceeds a preselected level during said prescanning, and means responsive to said level sensing means for causing said intensity varying means to adjust the intensity of said beams so that said modulating means produces a predetermined modulated output for the highest output level of said photosensitive means detected during said prescanning.

4. Slow-scan video apparatus according to claim 3, including means for producing a voltage which is a logarithmic function of the output current of said photomultiplier, and means for adjusting the level of the output of said demodulating means so that the image stored in said reproducing and storing means has essentially the same gray scale as the image to be transmitted.

5. Slow-scan video apparatus according to claim 1, including means for coupling a ready signal from said receiver to said transmitter through said transmission path when said receiver is ready to receive information signals from said transmitter, said transmitter including indicator means responsive to said ready signal.

6. Slow-scan video apparatus according to claim 5, wherein said means for reproducing and storing comprises a display tube and photographic camera.

7. Slow-scan video apparatus comprising transmitter and receiver connected by a narrow band transmission path, said transmitter comprising a cathode-ray tube, vertical and horizontal sweep means for scanning an electron beam across the face of said tube, said beam being converted into a light beam on said tube face, said tube including means for varying the intensity of said light beam, means for focusing said light beam on the picture to be transmitted, photosensitive means responsive to the reflection of said light beam from said picture for producing a current which is a function of the light intensity of said reflected beam, an oscillator, means responsive to the current from said photosensitive means for modulating the output of said oscillator, means for prescanning said image prior to picture transmission, means for sensing when the level of the output of said photosensitive means exceeds a preselected level during said prescanning, and means responsive to said level sensing means for causing said intensity varying means to adjust the intensity of said beams so that said modulating means produces a predetermined modulated output for the highest output level of said photosensitive means detected during said prescanning, and means coupling the modulated output of said oscillator to said narrow band transmission path, said receiver comprising means for demodulating said modulated output applied to said transmission path, and means for reproducing and storing said image.

8. Slow-scan video apparatus according to claim 7, including means for producing a voltage which is a logarithmic function of the output current of said photomultiplier, and means for adjusting the level of the output of said demodulating means so that the image stored in said reproducing and storing means has essentially the same gray scale as the image to be transmitted.

9. Slow-scan video apparatus according to claim 7, including means for coupling a ready signal from said receiver to said transmitter through said transmission path when said receiver is ready to receive information signals from said transmitter, said transmitter including indicator means responsive to said ready signal.

10. Slow-scan video apparatus according to claim 9, wherein said means for reproducing and storing comprises a display tube and photographic camera.